United States Patent [19]
Singh et al.

[11] Patent Number: 5,306,574
[45] Date of Patent: Apr. 26, 1994

[54] METHOD OF LOW TEMPERATURE OPERATION OF AN ELECTROCHEMICAL CELL ARRAY

[75] Inventors: Prabhakar Singh, Export; Roswell J. Ruka, Churchill Boro; Raymond J. Bratton, Delmont, all of Pa.

[73] Assignee: Westinghouse Electric Corp., Pittsburgh, Pa.

[21] Appl. No.: 957,117

[22] Filed: Oct. 7, 1992

[51] Int. Cl.[5] .............................................. H01M 8/00
[52] U.S. Cl. .................................... 429/13; 429/33; 429/40; 429/24
[58] Field of Search ............... 204/59 R, 29, 295, 260; 429/13, 30, 31, 33, 40, 24

[56] References Cited

U.S. PATENT DOCUMENTS

| | | | |
|---|---|---|---|
| 4,395,468 | 7/1983 | Isenberg | 429/31 |
| 4,657,826 | 4/1987 | Tajima | 429/17 |
| 5,045,169 | 9/1991 | Feduska et al. | 429/31 |

Primary Examiner—Kathryn Gorgos
Attorney, Agent, or Firm—Daniel P. Cillo

[57] ABSTRACT

In the method of operating an electrochemical cell generator apparatus containing a generator chamber (20) containing an array of cells (12) having interior and exterior electrodes with solid electrolyte between the electrodes, where a hot gas (F) contacts the outside of the cells (12) and the generating chamber normally operates at over 850° C., where $N_2$ gas is fed to contact the interior electrode of the cells (12) in any case when the generating chamber (20) temperature drops for whatever reason to within the range of from 550° C. to 800° C., to eliminate cracking within the cells (12).

8 Claims, 2 Drawing Sheets

METHOD OF LOW TEMPERATURE OPERATION OF AN ELECTROCHEMICAL CELL ARRAY

The Government of the United States of America has rights in this invention pursuant to Contract No. DE-AC21-80ET-17089, awarded by the United States Department of Energy.

BACKGROUND OF THE INVENTION

This invention relates to start up, shut down or other operation of an electrochemical cell array, such as a solid oxide electrolyte fuel cell array or an electrolyzer array, when the cell temperature is below the 800° C. to 1200° C. normal operating temperature of the array, to prevent cracking of the air electrode at such lower temperatures.

High temperature, solid oxide electrolyte electrochemical cell configurations of interior tubular air electrodes and exterior tubular fuel electrodes, with a solid oxide electrolyte therebetween, are well known in the art, and are taught in U.S. Pat. No. 4,395,468 (Isenberg). The air electrode of the fuel cell can be comprised of doped or undoped oxides or mixtures of oxides in the Perovskite family, such as $LaMnO_3$, $CaMnO_3$, $LaNiO_3$, $LaCoO_3$, $LaCrO_3$, and the like. The usual air electrode material is $LaMnO_3$ doped with Ca or Sr, as a substitute for part of the La. In all cases, the air electrode must be porous, that is, have from 20% to 40% porosity (60% to 80% of theoretical density) in order to be operable in the fuel cell. The air electrode can be supported by a porous, tubular support of stabilized zirconia, usually yttria stabilized zirconia.

The cells are usually operated in a square packed array of rows and columns with series-parallel electrical connections. These arrays are operated in a fuel cell generator, such as shown in U.S. Pat. No. 4,395,468 (Isenberg), where preheated air at 800° C. to 900° C. is fed within the fuel cells in the generating chamber to contact the air electrode and preheated fuel is fed around the periphery of the fuel cells in the generating chamber to contact the exterior fuel electrode at about 1000° C. The cells can also be operated in an electrolyzer mode where electricity is put into the cell steam is fed to contact the exterior electrode, and $O_2$ is generated within the cell.

It has been found that air electrode and air electrode porous support tube assemblies sometimes crack during start-up or shut-down thermal cycling and prolonged isothermal exposure in the temperature range of 550° C. to 800° C. What is needed is a process which can be used to operate such an electrochemical cell arrays in an electrochemical cell generator during such low temperature cycles. It is one of the objects of this invention to provide such a method of operation.

SUMMARY OF THE INVENTION

Accordingly, the invention resides in a method of operating an electrochemical cell generator apparatus comprising a generating chamber containing a cell array of electrically connected, parallel, elongated cells, each cell having an exterior electrode, an interior electrode, and solid oxide electrolyte therebetween, where hot gas is fed to the exterior electrode and where the generating chamber normally operates at a temperature over 850° C., characterized by the step of operating the generator by contacting the interior electrode with a gas containing at least 90 vol % $N_2$ during any period that the generating chamber temperature drops within the range of from 550° C. to 800° C.

Preferably, the nitrogen containing gas will be industrial grade $N_2$ of about 99% purity. When the generator operates as a fuel cell, hot fuel gas, such as $H_2+CO$ is fed to the exterior electrode, air is fed to the interior air electrode, and electricity is generated. When the generator operates as an electrolyzer, steam+$H_2$ is fed to the exterior electrode, $O_2$ is recovered through the interior air electrode, and electricity is fed to the cell to generate $O_2$. In both cases, the cells can be supported by tubular zirconia supports that are of substantially the same construction and normally operate from 800° C. to 1200° C. Use of $N_2$ during cool operation solves any air electrode cracking problems, partly by limiting the change in the oxygen content of the interior electrode lattice during cool down to from 550° C. to 800° C. Also minimization of differential mismatch between the interior electrode and the support is minimized by the $N_2$ atmosphere.

BRIEF DESCRIPTION OF THE DRAWINGS

In order that the invention can be more clearly understood, conventional embodiments thereof will now be described by way of example, with reference to the accompanying drawing in which.

DESCRIPTION OF THE PREFERRED EMBODIMENTS

Figure 1:
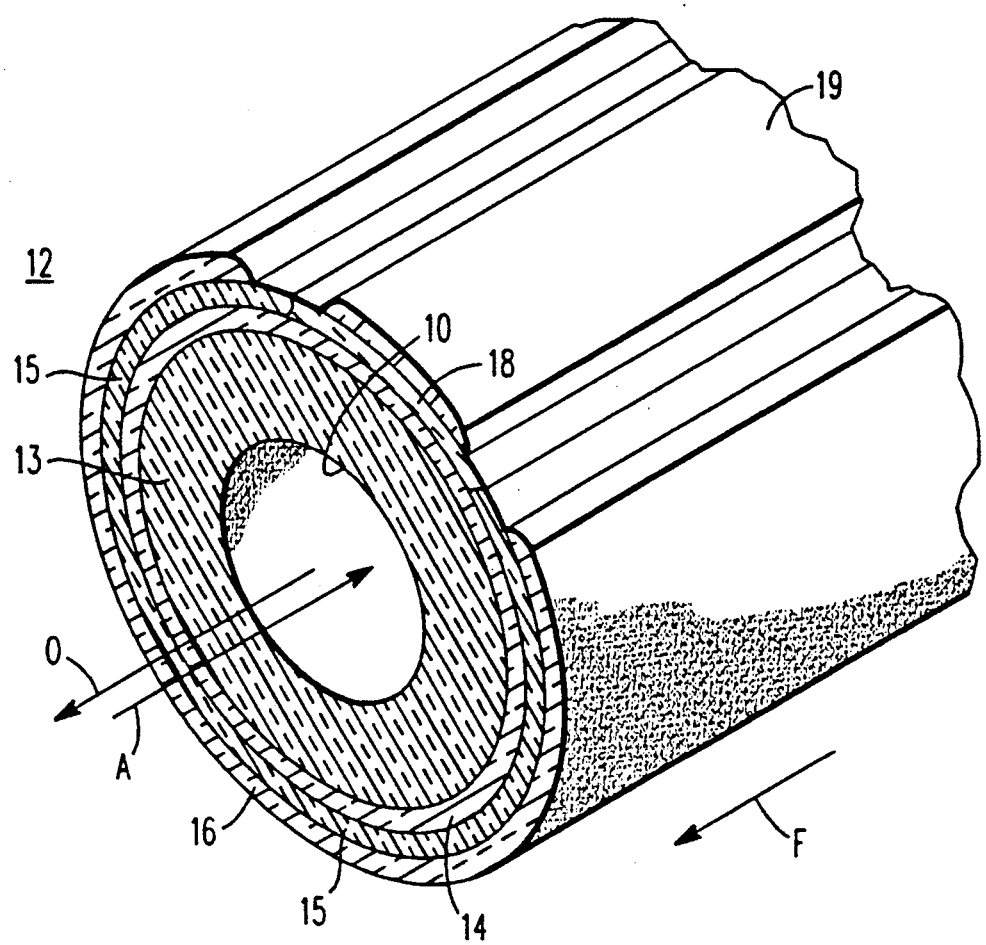
FIG. 1 is an isometric section view of an electrochemical cell used in this invention.

Referring now to FIG. 1, electrochemical cell 12 is shown, containing an inner electrode 14, an exterior electrode 16 and solid oxide electrolyte 15, between the electrodes. The interior electrode 14, is typically a tube of porous, calcia or strontia, doped lanthanum manganite, usually formed by extrusion or a slurry dip sinter operation. This layer is usually from 500 micrometers to 2,000 micrometers thick. Electrolyte 15 must be a solid material through which oxygen ions can diffuse or permeate. The electrolyte material is preferably an oxide having a fluorite structure or a mixed oxide in the Perovskite family, but other simple oxides, mixed oxides, or mixtures of simple and mixed oxides can be used. The preferred electrolyte material is a stabilized zirconia based ceramic, a readily available commercial material. A useful composition is $(ZrO_2)_{0.90}(Y_2O_3)_{0.10}$ as that material works well in solid oxide fuel cells. The electrolyte 15 is applied over a substantial portion of the inner electrode 14, as shown in FIG. 1, next to the narrow radial segment interconnection 18, which is usually applied first so that the electrolyte can overlap it. The electrolyte is usually applied to the top of the air electrode by a chemical/electrochemical vapor deposition process using two reactant gases.

An outer, porous, cermet electrode 16, usually called the fuel electrode, is then deposited over a substantial portion of the electrolyte 15, as shown in FIG. 1. First, particles of an electronic conductor are applied to the electrolyte surface, then a skeleton of yttrium and zirconium oxide is applied around the particles by a modified electrochemical vapor deposition or other process. The preferred particles are nickel, cobalt, and alloys and mixtures thereof, as these metals are stable, sulfur resistant, and have an acceptable oxidation potential. A metal or additional fuel electrode material 19 can be coated over the interconnection 18.

Figure 2:
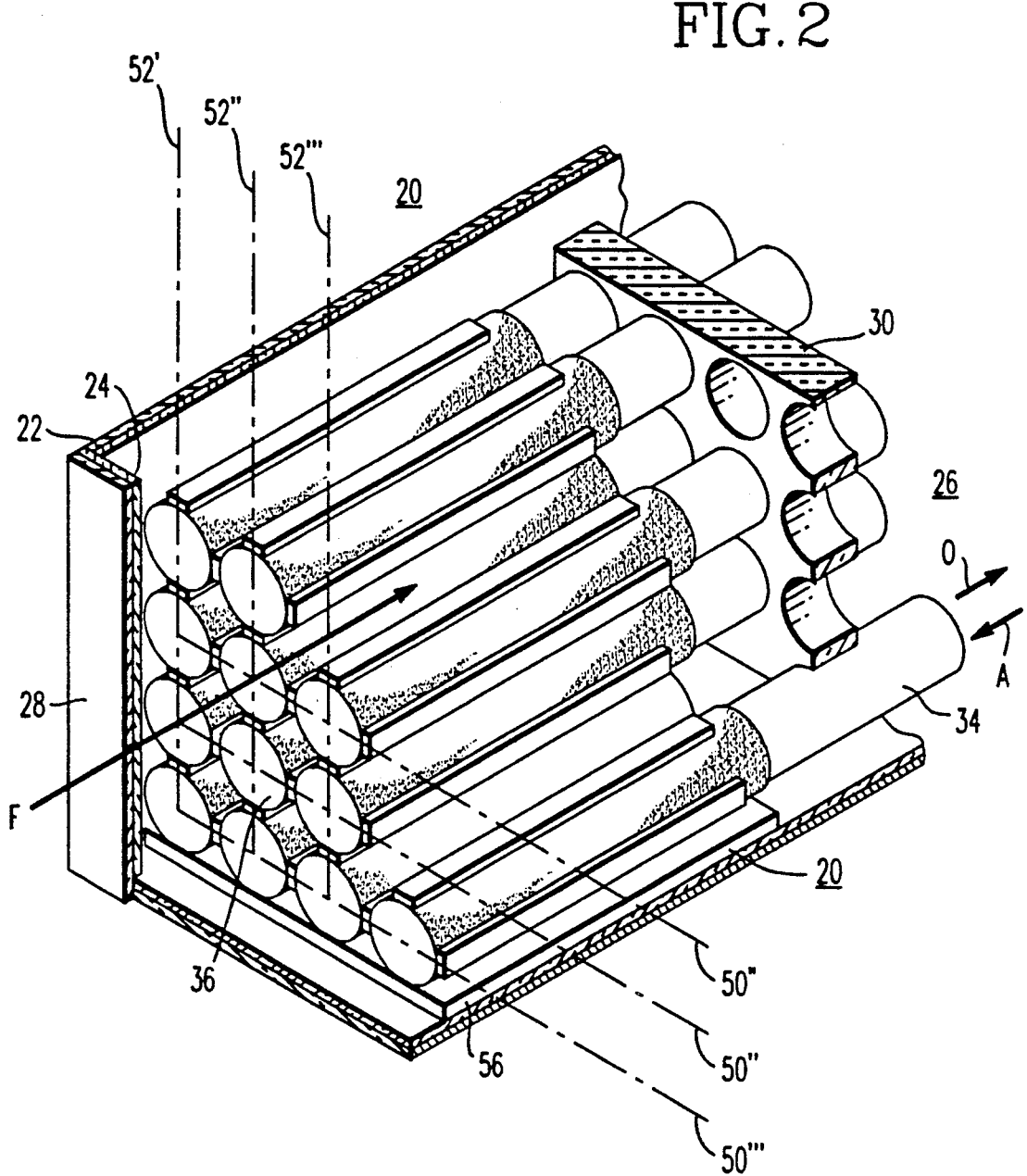
FIG. 2, which best illustrates the invention, is a broken perspective view of an electrochemical generator with an array of cells in accordance with the invention.

FIG. 2 shows a generating chamber 20 of an electrochemical cell generator, with a gas tight housing 22, such as steel, lined with insulation, such as low density alumina 24 surrounding it, as is well known in the art. When used as a fuel cell generator, a combustion/preheating chamber 26 is used to combust spent oxidant and fuel to preheat oxidant flowing into the cells 12. Fuel F inlet through end wall 28 of housing 22 is not shown.

The generating chamber 20 extends between the end wall 28 of the housing 22 and a porous barrier 30. The preheating chamber 26 extends between the porous barrier 30 and a tube sheet (not shown). The high temperature, elongated solid oxide cells extend between the preheating chamber 26 and the end wall 28, within the generating chamber 20. The cells have open ends 34 (not shown) in the preheating chamber 26 and closed ends 36 in the generating chamber 20.

Each individual cell generates approximately one volt when acting as a fuel cell and a plurality are electrically interconnected, preferably in a series-parallel rectangular array. For descriptive purposes, the arrangement can be described as including rows and columns. Each cell in a row 50 "and 50'" is electrically connected along its active length to the next adjacent cell, preferably through direct contact of their outer peripheries. Thus, cell-to-cell contact within a row is in parallel, among adjacent anodes. Each cell in a column is electrically interconnected in series to the next adjacent cell. In the preferred configuration, this interconnection is made from the inner cathode of one cell to the outer anode of the next consecutive cell, through an interconnect and plating coating 18 and 19 in FIG. 1 and a metal fiber felt. Direct current electrical energy is fed through or collected by, for example, a conductive metal plate 56 or felt pad, positioned in electrical contact with each cell in the first row, and a similar second plate (not shown), positioned in contact with the last row.

Referring now to FIG. 1 and FIG. 2, during operation of the generator apparatus as a fuel cell generator, an oxidant such as air, arrow A, enters through inlet port 26 open end 34 of the fuel cells passing into the interior 10 of the cell. Air enters the generator at a temperature of approximately 500° to 700° C., and a pressure above atmospheric, being initially heated prior to entering the housing by conventional means, such as a heat exchanger coupled with a blower. The air flows within conduits (not shown) and then through the preheating chamber 26, where it is further heated to a temperature of approximately 900° C. The air then flows through the length of the conduit, being further heated to approximately 1000° C., and is discharged into the fuel cell. The air within the fuel cell passes through the porous support 13 and the interior air electrode 14 and then electrochemically reacts at the interface of the solid electrolyte 15 and fuel cell air cathode 14, depleting somewhat in oxygen content as it approaches the open end of the cell. The depleted air is discharged into the combustion product or preheating chamber 26.

For fuel cell application, a fuel, arrow F, such as hydrogen or a mixture of carbon monoxide with hydrogen, flows from a preheating apparatus into the generating chamber 20 through fuel inlet port (not shown). The fuel flows over and about the exterior of the fuel cells, electrochemically reacting at the anode. The fuel inlet port is preferably located near the closed ends 36 of the cells, and accordingly depletes as it approaches the porous barrier 30. The depleted fuel, containing approximately five percent to fifteen percent of its initial fuel content, diffuses through the barrier 30 and into the preheating chamber 26.

The combustion products, including oxygen depleted air, and depleted fuel, along with any air leaking into the preheating chamber 26, directly react exothermically. The heat of this reaction, which completely combusts the depleted fuel, along with the sensible heat of the depleted fuel and air are used to preheat the incoming air. The combustion products are discharged through a combustion product port (not shown) in the preheating chamber 26 at a temperature of approximately 900° C. Thus, the fuel F is, for example, $H_2 + CO_2$ and oxidant A is fed into the fuel cell. Oxygen passes through the electrolyte as oxygen ions $O^{2-}$. Waste products include carbon dioxide and water vapor. The reactions for operation as a fuel cell are:

$$\tfrac{1}{2}O_2 + 2e^- \longrightarrow O^{2-}, \text{ and}$$

$$H_2 + CO + 2O^{2-} \longrightarrow H_2O + CO_2$$

Normally, the temperature must be over 850° C. for these reactions to occur and for the electrolyte to act efficiently as an oxygen ion carrier.

When the electrochemical cell generator is to be operated as an electrolyzer, to provide $O_2$ from steam, the cells are constructed exactly the same as shown in FIG. 1 and may be interconnected in substantially the same way as FIG. 2.

Electricity is fed into each cell 12 and a mixture of steam + $H_2$ is fed as a hot gas F to the exterior electrode, at a temperature of about 850° C. to 1100° C. In this case, however, $O_2$, (arrow O) is passed out of the interior 10 of the cell 12 at about 900° C. by the reaction:

$$H_2O_{(g)} + 2e^- \longrightarrow H_2 + O^{2-}$$

$$O^{2-} \longrightarrow (\tfrac{1}{2})O_2 + 2e^-$$

Hydrogen must be included so as not to corrode the metallic particles in the external electrode. Oxygen passes through the electrolyte as oxygen ions whereas the $H_2$ remains external to the cell.

In this invention, whenever the generating chamber 20 is caused to operate in the range of from 500° C. to 800° C., such as during shut down, start up, malfunction or the like, a gas containing at least 90 vol % $N_2$ is fed to contact the inside of the interior electrode. Industrial grade 99+ vol % $N_2$ is preferred. This $N_2$ purging is effective for stabilized zirconia supported fuel cells or electrolyzer cells and can be useful for any supported or unsupported interior electrode made of the materials previously described, for example, doped lanthanum manganite, that is not chemically or mechanically thermally stable in the range of from 550° C. to 800° C.

The structural and chemical stability of the air electrode-porous support tube assembly was found to be based on the following findings: (a) The isothermal shrinkage of the interior, lanthanum manganite electrode is minimized in nitrogen atmosphere during lower temperature exposure, (b) change in the oxygen content of the interior, lanthanum manganite electrode lattice during cool down is minimized when exposed to nitrogen atmosphere, and (c) stresses generated in the interior, lanthanum manganite electrode-porous support tube assemblies are also minimized in nitrogen atmosphere due to the prevention/minimization of the differential mismatch between the electrode and the porous support tubes.

The invention will now be illustrated with reference to the following example:

EXAMPLE

To confirm and verify the technical approach discussed above, doped lanthanum manganite electrode-stabilized zirconia porous support tube assemblies obtained form several fuel cell sections were evaluated for cracking resistance during high temperature and cycling exposure in air and nitrogen. A list of experiments conducted is given in Table 1 along with the behavior of cell sections after termination of cell tests:

TABLE 1

| Cell | Exposure Time (Hrs) | Exposure Temp. (°C.) | Exposure Atmosphere | Thermal Cycles | Observation after Completion of the test |
|---|---|---|---|---|---|
| *1 | 212 | 750 | Air | 4 | 3 sections cracked in furnace after 112 hrs., 2 cycle exposure. After termination of the test, section tested under 20 kgs load on DPH showed cracking. |
| *2 | 4, 6, 12, 24 | 750 | Air | — | An electrode section tested for up to 12 hrs. did not crack. Mixed cracking observed on 24 hr. exposure section. |
| 3 | 40 | 750 | $N_2$ | — | Air electrode section did not crack. |
| *4 | 12, 24, 50 | 750 | Air | — | Except for 12 hrs. exposure, all other air electrode sections cracked. |
| 5 | 24 | 750 | $N_2$ | — | Air electrode sections did not crack. |
| *6 | 67, 89 | 1000 | Air | — | Air electrode sections did not crack. |
| *7 | 12, 24, 50 | 750 | Air | — | Air electrode section cracked 24 hr. exposure showed mixed results. |
| 8 | 50 | 750 | $N_2$ | — | Air electrode section did not crack. |
| *9 | 50 | 600 | Air | — | Air electrode section cracked. |
| 10 | 50 | 600 | $N_2$ | — | Air electrode section did not crack. |
| *11 | 50 | 500 | Air | — | Air electrode did not crack. |
| *12 | 50 | 800 | Air | — | Air electrode cracked. |
| *13 | 6, 12, 18, 24 | 750 | Air | 4 | Except for 24 hrs. exposure, section shows no cracks. |
| *14 | 6, 12 | 750 | Air | 4 | 2 sections cracked after 1st cycle. All sections cracked after 2 thermal cycles. |
| 15 | 6, 12 | 750 | $N_2$ | 2 | Air electrode sections did not crack. |
| *16 | 287 | 750 | Air | 3 | Air electrode section did not crack. |

*Comparative Examples
The cells comprised an air electrode of $La_{.9}Sr_{.1}MnO_3$ and a support of $(ZrO_2)_{.85}(CaO)_{.15}$ As can be seen from Table 1, none of the cells exposed to $N_2$ gas, the cells of this invention: Nos. 3, 5, 8, 10 and 15 between 600° C. and 750° C., including those exposed to thermal cycling, cracked. Cell No. 6 was not exposed to air below 800° C. and so did not crack and Cell No. 11 was subjected to a benign environment of only 500° C. Cell No. 16 did not crack just as only a certain number of cells will crack at the lower temperatures. Also, some of the other cells cracked in air only upon 24 hours prolonged exposure. Invention Cell Nos. 3, 8 and 10 shows superior crack resistance at 40 to 50 hours.

Microscopic observations on air electrode exposed to nitrogen did not indicate any structural or chemical modification of the air electrode material. Strength measurements on air electrode-porous support tube composites exposed to nitrogen or air further indicated that the burst strength of the nitrogen treated sample did not change appreciably, whereas the air treated section showed a large reduction in the strength. It is clear that the exposure of the air electrode to nitrogen clearly prevents the cracking of the air electrode-porous support tube assemblies.

What is claimed is:

1. In a method of operating a fuel cell apparatus comprising a generating chamber containing a cell array of electrically connected, parallel, elongated cells, each cell having an exterior porous electrode, an interior porous electrode having an inside portion, and solid oxide electrolyte therebetween which solid electrolyte transports oxygen as oxygen ions only, at temperature over 850° C., where hot fuel gas is fed to the exterior electrode, and hot oxidant gas is fed to the inside of the interior electrode and where the generating chamber normally operates at a temperature over 850° C., wherein the improvement comprises operating the generator with the change of contacting the interior electrode with a gas containing at least 90% vol % $N_2$ during any period that the generating chamber temperature drops within the range of from 550° C. to 800° C.

2. The method of claim 1, where the nitrogen gas is at least 99 vol % $N_2$.

3. The method of claim 1, where the air electrode comprises doped lanthanum manganite.

4. The method of claim 1, where the air electrode comprises doped lanthanum manganite, supported by a tube comprising stabilized zirconia.

5. The method of claim 1, where the electrolyte is yttria stabilized zirconia, and the cells are tubular and axially elongated.

6. The method of claim 1 where the generating chamber is within a gas tight insulated housing of the fuel cell apparatus.

7. The method of claim 1, wherein isothermal shrinkage of the interior electrode and the change in the oxygen content of the interior electrode lattice at from 550° C. to 800° C. is minimized by $N_2$ contact.

8. The method of claim 4, where the differential mismatch between the interior electrode and the porous support tube is minimized by the $N_2$ atmosphere at from 550° C. to 800° C.

* * * * *